(12) United States Patent
Gordon et al.

(10) Patent No.: US 10,810,316 B2
(45) Date of Patent: Oct. 20, 2020

(54) UPDATING MONITORING SYSTEMS USING MERGED DATA POLICIES

(71) Applicant: International Business Machines Corporation, Armonk, NY (US)

(72) Inventors: Itai Gordon, Modiin (IL); Shlomit Avrahami, Jerusalem (IL); Ilan D. Prager, Jerusalem (IL)

(73) Assignee: International Business Machines Corporation, Armonk, NY (US)

( * ) Notice: Subject to any disclaimer, the term of this patent is extended or adjusted under 35 U.S.C. 154(b) by 238 days.

(21) Appl. No.: 15/595,414

(22) Filed: May 15, 2017

(65) Prior Publication Data

US 2018/0330107 A1 Nov. 15, 2018

(51) Int. Cl.
G06F 21/60 (2013.01)
G06F 21/55 (2013.01)
G06F 21/62 (2013.01)
G06F 16/11 (2019.01)

(52) U.S. Cl.
CPC .......... *G06F 21/604* (2013.01); *G06F 16/122* (2019.01); *G06F 21/552* (2013.01); *G06F 21/6218* (2013.01)

(58) Field of Classification Search
CPC .............................. G06F 21/604; G06F 21/552
USPC ........................................................ 713/150
See application file for complete search history.

(56) References Cited

U.S. PATENT DOCUMENTS

| | | | |
|---|---|---|---|
| 7,363,650 B2 | 4/2008 | Moriconi | |
| 8,918,895 B2 | 12/2014 | Agrawal et al. | |
| 9,224,067 B1 | 12/2015 | Lu et al. | |
| 9,762,603 B2* | 9/2017 | Grondin | G06F 16/24578 |
| 10,152,607 B2 | 12/2018 | Fuchs | |
| 2004/0103147 A1 | 5/2004 | Flesher et al. | |
| 2008/0104663 A1 | 5/2008 | Tokutani et al. | |
| 2009/0037488 A1 | 2/2009 | Abrams | |
| 2010/0037289 A1 | 2/2010 | Roy et al. | |
| 2010/0063959 A1 | 3/2010 | Doshi et al. | |
| 2011/0167105 A1* | 7/2011 | Ramakrishnan | G06Q 10/10 709/203 |

(Continued)

OTHER PUBLICATIONS

"Synchronizing rules between business users and developers," WebSphere ILOG JRules, Version 7.1.1, IBM Knowledge Center, 2 pages, Printed: Apr. 19, 2017. http://www.ibm.com/support/knowledgecenter/SS6MTS_7.1.1/com.ibm.websphere.ilog.jrules.doc/Content/Business_Rules/Documentation/_pubskel/JRules/ps_JRules_Global647.html.

(Continued)

*Primary Examiner* — Lynn D Feild
*Assistant Examiner* — Viral S Lakhia
(74) *Attorney, Agent, or Firm* — Brian D. Welle

(57) ABSTRACT

An example system includes a processor to monitor a data asset and associated access policies to be synchronized to detect a trigger. The processor is to also request and receive data lineage information on the monitored data asset in response to detecting the trigger. The processor is to further detect a source system and a target system based on the data lineage information. The processor is also to query an access policy of the source system and an access policy of the target system. The processor is to merge the access policy of the source system and the access policy of the target system based on a predetermined merger configuration to generate a merged access policy. The processor is to update a monitoring system based on the merged access policy.

17 Claims, 7 Drawing Sheets

(56) References Cited

U.S. PATENT DOCUMENTS

| | | | |
|---|---|---|---|
| 2012/0030243 A1* | 2/2012 | Ishikawa | G06F 21/604 |
| | | | 707/785 |
| 2012/0324528 A1* | 12/2012 | Ferracane | H04L 67/02 |
| | | | 726/1 |
| 2013/0031136 A1 | 1/2013 | Shah | |
| 2014/0101091 A1 | 4/2014 | Brown et al. | |
| 2014/0133358 A1* | 5/2014 | Yin | H04L 41/0893 |
| | | | 370/254 |
| 2014/0165133 A1* | 6/2014 | Foley | H04L 63/14 |
| | | | 726/1 |
| 2015/0163206 A1 | 6/2015 | McCarthy | |
| 2015/0242633 A1 | 8/2015 | Galil et al. | |
| 2016/0154896 A1* | 6/2016 | Simitsis | G06F 16/2372 |
| | | | 707/741 |
| 2016/0171237 A1 | 6/2016 | Antic et al. | |
| 2016/0212167 A1 | 7/2016 | Dotan et al. | |
| 2016/0248743 A1 | 8/2016 | Milman et al. | |
| 2016/0306827 A1* | 10/2016 | Dos Santos | G06F 16/25 |
| 2017/0078135 A1* | 3/2017 | Zeng | H04L 29/06 |
| 2017/0124126 A1* | 5/2017 | Halberstadt | G06F 16/9017 |
| 2017/0193244 A1 | 7/2017 | Riley | |
| 2017/0236080 A1* | 8/2017 | Singh | H04W 4/70 |
| | | | 705/7.28 |
| 2017/0316215 A1* | 11/2017 | Hadzic | G06F 21/31 |
| 2017/0322732 A1 | 11/2017 | Lissone | |
| 2017/0364555 A1* | 12/2017 | Sirigireddy | G06F 21/6218 |
| 2018/0060365 A1 | 3/2018 | Mujumdar et al. | |
| 2018/0084012 A1* | 3/2018 | Joseph | H04L 63/1425 |
| 2018/0218037 A1* | 8/2018 | Marquardt | G06F 16/2228 |
| 2018/0288063 A1* | 10/2018 | Koottayi | G06F 21/552 |
| 2018/0307859 A1* | 10/2018 | LaFever | G06F 21/6254 |
| 2018/0330107 A1* | 11/2018 | Gordon | G06F 21/552 |
| 2019/0141584 A1* | 5/2019 | Ben Henda | H04W 60/02 |
| 2019/0230125 A1* | 7/2019 | Lee | H04L 69/22 |

OTHER PUBLICATIONS

"Overview: Syncing access policies with a Sync-Only device group," Manual Chapter: Synchronizing Access Policies, AskF5 Knowledge Centers Resources, 4 pages, Printed Apr. 19, 2017. https://support.f5.com/kb/en-us/products/big-ip_apm/manuals/product/apm-implementations-11-6-0/4.html.

Mell et al., "The NIST Definition of Cloud Computing," Recommendations of the National Institute of Standards and Technology, Special Publication 800-145, Sep. 2011, 7 pages, National Institute of Standards and Technology, Gaithersburg, MD.

Gordon et al., "Updating Monitoring Systems Using Merged Data Policies", U.S. Appl. No. 15/839,899, filed Dec. 13, 2017.

IBM, List of IBM Patents or Patent Applications Treated as Related, Dec. 12, 2017, 2 pages.

Accelerated Examination Support Document, U.S. Appl. No. 15/839,899, filed Dec. 6, 2017, 16 pgs.

Gordon et al., "Updating Monitoring Systems Using Merged Data Policies", U.S. Appl. No. 16/297,993, filed Mar. 11, 2019.

IBM, List of IBM Patents or Patent Applications Treated as Related, Mar. 8, 2019, 2 pages.

Accelerated Examination Support Document, U.S. Appl. No. 16/297,993, filed Mar. 8, 2019, 20 pgs.

* cited by examiner

300

UPDATING MONITORING SYSTEMS USING MERGED DATA POLICIES

BACKGROUND

The present techniques relate to updating monitoring systems. More specifically, the techniques relate to updating monitoring systems using merged data policies.

SUMMARY

According to an embodiment described herein, a system can include a processor to monitor a data asset and associated access policies to be synchronized to detect a trigger. The processor can also further request and receive data lineage information on the monitored data asset in response to detecting the trigger. The processor can also detect a source monitoring system and a target monitoring system based on the data lineage information. The processor can further query an access policy of the source monitoring system and an access policy of the target monitoring system. The processor can also further merge the access policy of the source monitoring system and the policy of the target monitoring system based on a predetermined merger configuration to generate a merged policy. The processor can also update the access policy of the source monitoring system, or the access policy of the target monitoring system, or both, based on the merged access policy.

According to another embodiment described herein, a method can include monitoring, via a processor, a data asset and associated access policies to be synchronized to detect a trigger. The method can also further include requesting and receiving, via the processor, data lineage information on the monitored data asset in response to detecting the trigger. The method can also include detecting, via the processor, a source monitoring system and a target monitoring system based on the data lineage information. The method can include querying, via the processor, an access policy of the source monitoring system and an access policy of the target monitoring system. The method can also include merging, via the processor, the access policy of the source monitoring system and the access policy of the target monitoring system based on a predetermined merger configuration to generate a merged access policy. The method can also further include updating, via the processor, the access policy of the source monitoring system or the access policy of the target monitoring system based on the merged access policy.

According to another embodiment described herein, a computer program product for updating monitoring systems can include computer-readable storage medium having program code embodied therewith. The computer readable storage medium is not a transitory signal per se. The program code is executable by a processor to cause the processor to monitor a data asset and associated access policies to be synchronized to detect a trigger. The program code can also cause the processor to request and receive data lineage information on the monitored data asset in response to detecting the trigger. The program code can also cause the processor to detect a source system and a target system based on the data lineage information. The program code can also cause the processor to query an access policy of the source system and an access policy of the target system. The program code can also cause the processor to also further merge the access policy of the source system and the access policy of the target system based on a predetermined merger configuration to generate a merged access policy. The program code can also further cause the processor to update the access policy of the source system or the access policy of the target system based on the merged access policy.

DETAILED DESCRIPTION

Figure 1:
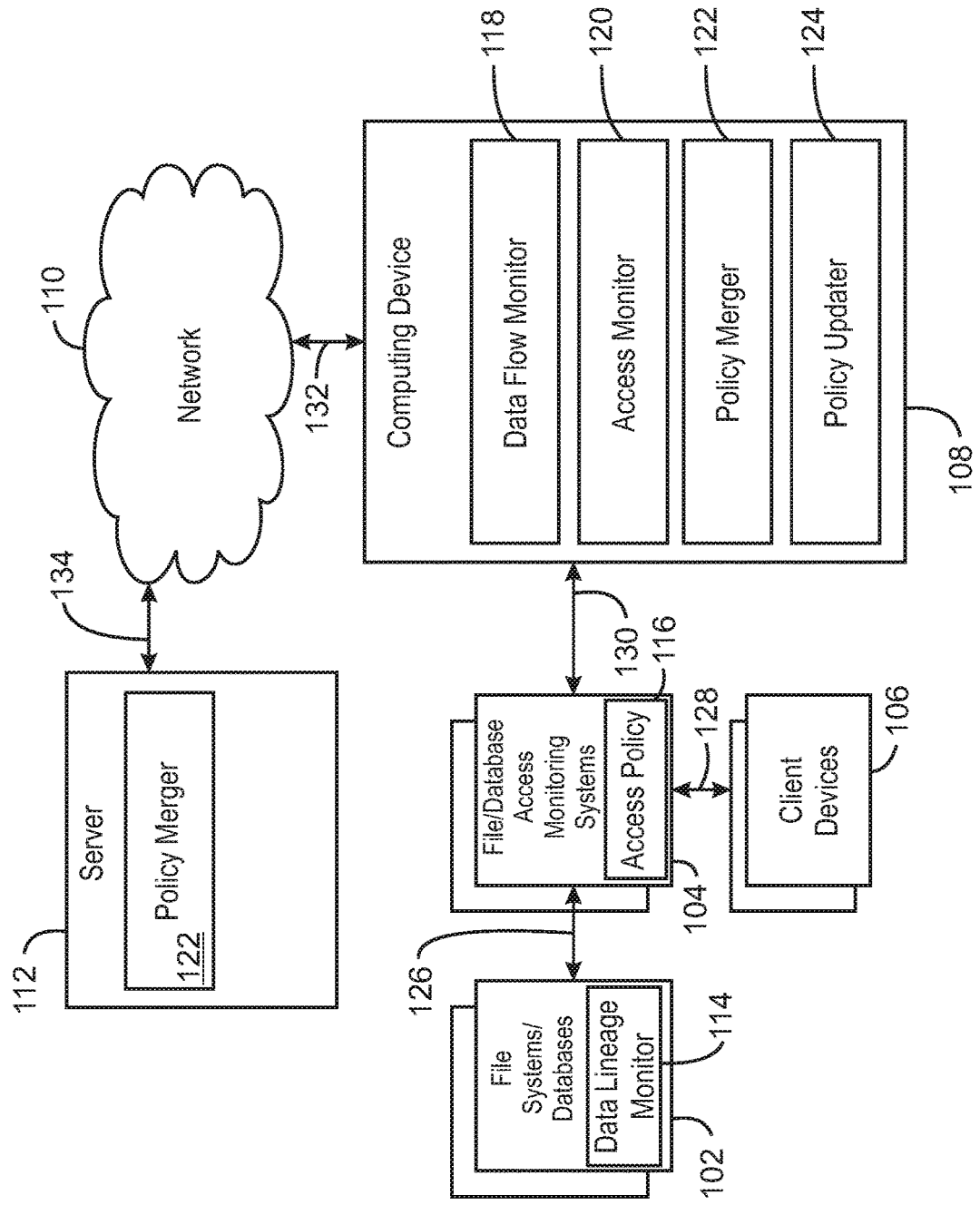
FIG. 1 is a block diagram of an example system that can update monitoring systems using merged data policies.

Some organizations may use data access monitoring systems which monitor access to sensitive information in databases and file systems in order to prevent data leakage. For example, each data element of a database or file system might have a separate access policy. In some examples, an access policy may include rules deciding who can read, write, move, or copy this data. Some organizations also have extract, transform, load (ETL) systems that move and change data between different systems in the enterprises.

However, the same sensitive content residing in different systems may be monitored by different policies. For example, an ETL job may read sensitive data from few places in a database for analysis process, subsequently write the sensitive data to temporary files for processing and transformation, and then write the sensitive data content into another database. Thus, the same sensitive content may be monitored by three different systems which may have three different policies for accessing the sensitive data. This may create a risk of sensitive data being access using a less restrictive access policy. Moreover, manually synchronizing these different policies may not be an easy or feasible task.

According to embodiments of the present techniques a processor may update access policies on different monitoring systems based on a merged access policy. For example, the data monitoring systems may be file access monitoring systems or database access monitoring systems. The processor can monitor a data asset associated with policies to be synchronized to detect a trigger. The processor may execute a data lineage on the monitored data asset in response to detecting the trigger. For example, the trigger may be one of a number of events that are described in detail below. The processor may also detect a source system and a target system based on the data lineage. The processor may further query an access policy of the source system and an access policy of the target system. The processor may then merge the access policy of the source system and the access policy of the target system based on a predetermined merger configuration to generate a merged access policy. The processor may then update a monitoring system based on the merged access policy.

Thus, the present techniques may able to synchronize changes in a data access policy of a monitoring system with access policies of other data monitoring systems. The present techniques may be able to assure policy integrity across enforcement point. For example, the present techniques can be used to guarantee that a user can execute an action with a first asset (such as a file or database field) and any other assets that include copies of the same data stored in the first asset. Thus, the techniques described herein may enable improved security for sensitive data. Moreover, the present techniques assure policy integrity across enforcement points by enforcing that no user can perform an action in one asset, such as a file or database field, that the user is not allowed to perform in other data assets with the same data. In addition, the techniques are able to synchronize the access policies in real time so that data access monitoring systems can use consistent and up-to-date access policies in providing access or denying access to sensitive data.

In some scenarios, the techniques described herein may be implemented in a cloud computing environment. As discussed in more detail below in reference to at least FIGS. 4, 5, and 6, a computing device configured to update monitoring systems using merged data policies may be implemented in a cloud computing environment. It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

FIG. 1 is a block diagram of an example system that can update monitoring systems using merged data policies. The system is generally referred to using the reference number 100 and can be implemented at least in part using the computing device 400 of FIG. 4 below.

The example system 100 includes any number of files systems and databases 102, a number of file access monitoring systems (FAMs) or database access monitoring systems (DAMs) 104, one or more client devices 106, computing device 108, a network 110, and a server 112. For example, the server 112 may be a cloud computing node.

Each of the file systems/databases also include a data lineage monitor 114. Each of the file/database access monitoring systems 104 include an access policy 116. The computing device 108 includes a data flow monitor 118, an access monitor 120, a policy merger 122, and a policy updater 124. For example, the data flow monitor 118 may be a data lineage system that provides information about how data flows between different data assets in an enterprise. As used herein, data assets may refer to files and databases stored within file systems/databases 102. The server 112 may also include a policy merger 122. In some examples, the data flow monitor 118, or data lineage system, may also be included in the server 112. The file systems/databases 102 are communicatively coupled to the file/database access monitoring systems 104 as shown by arrow 126. The file/database access monitoring systems 104 are communicatively coupled to the client devices as shown by arrow 128. The computing device 108 is communicatively coupled to the file/database access monitoring systems 104 as shown by arrow 130. The server 108 is also communicatively coupled to the computing device 104 via the network 106 as shown by arrows 132 and 134.

In the example system 100, the computing device 108 may synchronize access policies 130 across multiple file/database access monitoring systems 104. For example, the data flow monitor 118 of the computing device 108 may monitor data flow across the file/database access systems 102 by monitoring data lineage information from the data lineage monitor 114 of the file systems/databases 102. For example, the data lineage information may include metadata describing the origin of data of data in the file systems and databases 102 and where the data moves over time. The access monitor 120 may monitor changes in access policies 116 among the file/database access monitoring systems 104. In some examples, the access policies 116 may include rules associated with what actions each user can perform on each data asset of a file system or database 102. For example, a data asset may include a file, a folder, a field, a table, etc. In some examples, an access policy 116 may have general rules and specific rules. For example, the general rules may be based on type of content or metadata. In some examples, an access policy 116 may have specific rules. For example, the specific rules may be actions associated with specific assets. A specific rule may be, for example, if user A performs an action B on a file C, then do action E. In some examples, the access policies may specify who, when, and how users may access each data entity. In some examples, the file/database access monitoring systems 104 may also include an application programming interface (API) for querying and updating the rules of the access policies 116.

As shown in FIG. 1, the computing device 108 can query the access policies 116 of the file/database access monitoring systems 104 and synchronize the access policies 116 in each of the file/database access monitoring systems 104 with respect to actions that a user may perform on each data asset in the file systems/databases 102. In some examples, the computing device 108 can monitor and synchronize the access policies 116 in real time. For example, the retrieving of such rules may be time efficient because the file/database access monitoring systems 104 may use them in real time when determining if a user is allowed to perform an action or not.

In some examples, the data flow monitor 118 may monitor data lineage information from the data lineage monitor 114 of the file systems/databases 102. In some examples, the data lineage monitor 114 may be any tool that scans extract, transform, load (ETL) jobs and may create a graph of data flow. For example, starting from one data asset (such as a file or field), the data lineage monitor 114 may track how the data that was in the data asset was transferred to other data assets in an organization. In some examples, the tracked data may be sensitive data. For example, tools may be used to distinguish between sensitive and non-sensitive content. In some examples, trained knowledge bases and regular expressions that know to find sensitive data may be used to identify sensitive data. For example, regular expressions may be used to recognize if a number is a credit card or a form of identification. In some examples, the data flow monitor 118 may detect triggers for synchronizing access policies. For example, the trigger may be an access of sensitive content, such as a write or read to or from detected sensitive content.

In some examples, an access monitor 120 may monitor the access policies 116 of the file/database access monitoring systems 104. In some examples, the access monitor 120 may detect triggers for synchronizing the access policies. For example, when data is written to or read from a file system or database, the data lineage monitor 114 may be run in order to inspect data lineage monitor 114 and the policy updater 124 may update the access policies 116 accordingly. In some examples, when a job is detected running in an ETL system, the data flow inside may be inspected and the policy updater 124 may update access policies 116 accordingly. In some examples, the policy merger 122 can merge two or more access policies 116 to generate a merged access policy. For example, the policy merger 122 can decide how an access policy in one data asset will affect other data assets and how policies should be merged. In some examples, the policy merger 122 may merge policies based on a predetermined merger configuration. For example, an administrator may preconfigure the merger configuration. In some examples, the policy merger 122 could be connected to other systems (not shown) in the enterprise. For example, the policy merger 122 may be connected to a Lightweight Directory Access Protocol (LDAP) module in order to map between users and roles in the different systems and may contain transformation rules of access policy rules between different monitoring systems. For example, the policy merger and updater may use the LDAP module in order to map the same user between access policies in different monitoring systems. In some examples, the policy merger 122 may also contain rules indicating when to update specific policies or which types of changes are allowed for each monitoring system. For example, for more sensitive systems, more strict access rules may be added. For other systems, in some examples, access policy changes from a specific monitoring system may affect access policy. In some examples, the policy merger 122 may also contain rules to hierarchically affect policies in some system. For example, a hierarchical rule may indicate that a field access should change whenever the whole table access policy changes.

In some examples, the policy updater 124 can update one or more of the access policies 116 in response to a detected trigger using the merged access policy 116. In some examples, in response to the detected trigger, the policy updater 124 can check the data lineage of associated data assets. For example, the data lineage may be used to detect the data flows to and from each data asset. In some examples, for each data asset along the way of a data flow for a particular sensitive data, the policy updater 124 can check the access policy that is assigned to each data asset. In some examples, if the policy updater 124 detects a difference between the two or more different access policies, then the policy updater 124 can check with the policy merger 122 to determine if and how the two or more different access policies 116 should be merged. For example, in the case that sensitive data is masked or redacted along the way by an ETL job, the policy merger 122 may decide according to the merge policies engine that no synchronization or merging of policies is needed. In some examples, for each access monitoring system 104 along the way, the policy updater 124 can update the access policy 116 based on the output from the policy merger 122. In some examples, an access policy can be changed using an API that will create new rules based on the output of the policy merger 122 that will override the existing rules.

In one example, an ETL job may be reading sensitive data from a database and writing the sensitive data to temporary files for processing and transformation. The ETL job may also write the sensitive data into another database. Again, the same sensitive data or content may be monitored by three different systems which might have three different policies for accessing the sensitive data, which might enable unauthorized access of the sensitive data. Additionally, manually changing the access policy for the sensitive data or content may not be feasible. For each sensitive data value, the policy updater 124 may analyze the data flow to make sure the access policies for that sensitive content is the same in all the data assets the data is sitting. If not, then the policy updater 124 can synchronize the access policies for that sensitive content along the way. For example, the policy updater 124 may synchronize the access policies for the assets participating in the data lineage.

It is to be understood that the block diagram of FIG. 1 is not intended to indicate that the system 100 is to include all of the components shown in FIG. 1. Rather, the system 100 can include fewer or additional components not illustrated in FIG. 1 (e.g., additional file systems/databases, file/database access monitoring systems, computing devices, networks, servers, data lineages, access policies, modules, etc.). For example, the system 100 may also include a scheduler to run the data lineage periodically for inspecting changes in the sources of data updating the access policies 116 on a periodic basis.

Figure 2:
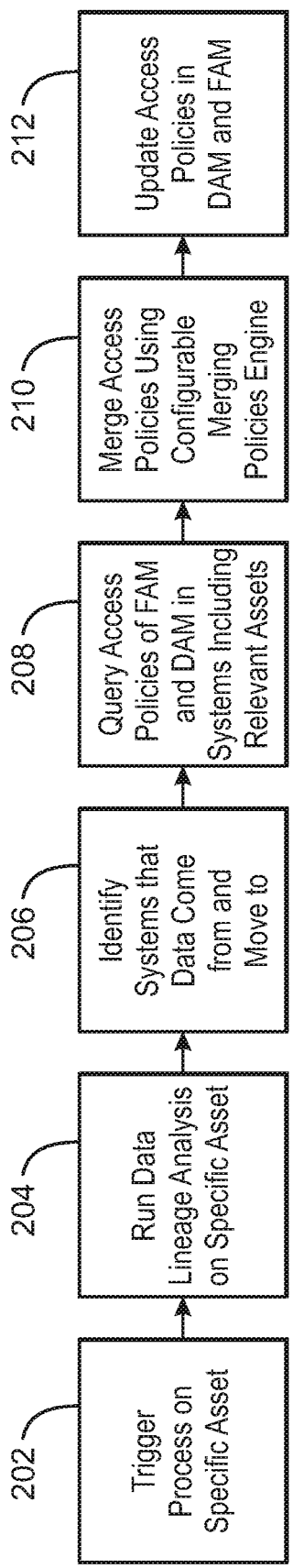
FIG. 2 is an process flow diagram of an example process that can update monitoring systems using merged data policies.

FIG. 2 is a process flow diagram of an example process that can update monitoring systems using merged data policies. The process 200 can be implemented with any suitable computing device, such as the computing device 108 of FIG. 1 above or the computing device 400 of FIG. 4 below.

At block 202, the process 200 is triggered on a specific asset. For example, the process 200 may be invoked on a specific data asset, such as a file, folder, database, table, or field, in one or more of the next cases according to a configurable merger policy. For example, the trigger may be a detected access policy change in one of any number of monitored access monitoring systems. In some examples, the trigger may be a detected access of sensitive content. For example, the access may be either a read or a write. In some examples, the trigger may be a detected ETL job running. For example, as part of the ETL job running, the FAMs and DAMs policies may be dynamically updated in real time. In some examples, the trigger may be a scheduled job. For example, the job may be scheduled to run from time to time to synchronize assets in some access monitoring system based on data lineage.

At block 204, a data lineage analysis is run on the specific asset. For example, the specific asset may be associated with sensitive data. In some examples, the sensitive data may have been transformed before entered into a system. For example, the sensitive data may have been read from a file but masked before it was written to a specific asset such as a database.

At block 206, systems that process sensitive data are identified. For example, since the location of where the data is residing is known, an API can be used to query those systems for their associated access policies. As one example, if the sensitive data is in a database, then a DAM may be queried. In another example, if the sensitive data is in a file system, then a FAM may be queried. In some examples, the systems may include file access monitoring (FAM) or database access monitoring (DAM) systems.

At block 208, identified systems including relevant data assets may have their access policies of their FAM and DAM queried. For example, the data assets may be relevant to particular sensitive data being tracked by a data lineage monitoring application.

At block 210, two or more access policies may be merged using a configurable merging policies engine. For example, an access policy for a user for an asset may be changed to be like an access policy for the user in the other assets. In some examples, the configurable merging policies engine may have a synchronization policy that may be configured by an administrator.

At block 212, access policies are updated in the FAM and DAM systems. For example, a new access policy may be generated based on the merged access policy and the old access policy for each of the FAM and DAM systems replaced with the new access policy. In some examples, the old access policies for some FAM and DAM systems may not be replaced. For example, if the relevant sensitive data at a FAM or DAM system was masked or redacted at a particular system, then the old access policy may not need to be replaced.

The process flow diagram of FIG. 2 is not intended to indicate that the operations of the system 200 are to be executed in any particular order, or that all of the operations of the system 200 are to be included in every case. Additionally, the process 200 can include any suitable number of additional operations.

Figure 3:
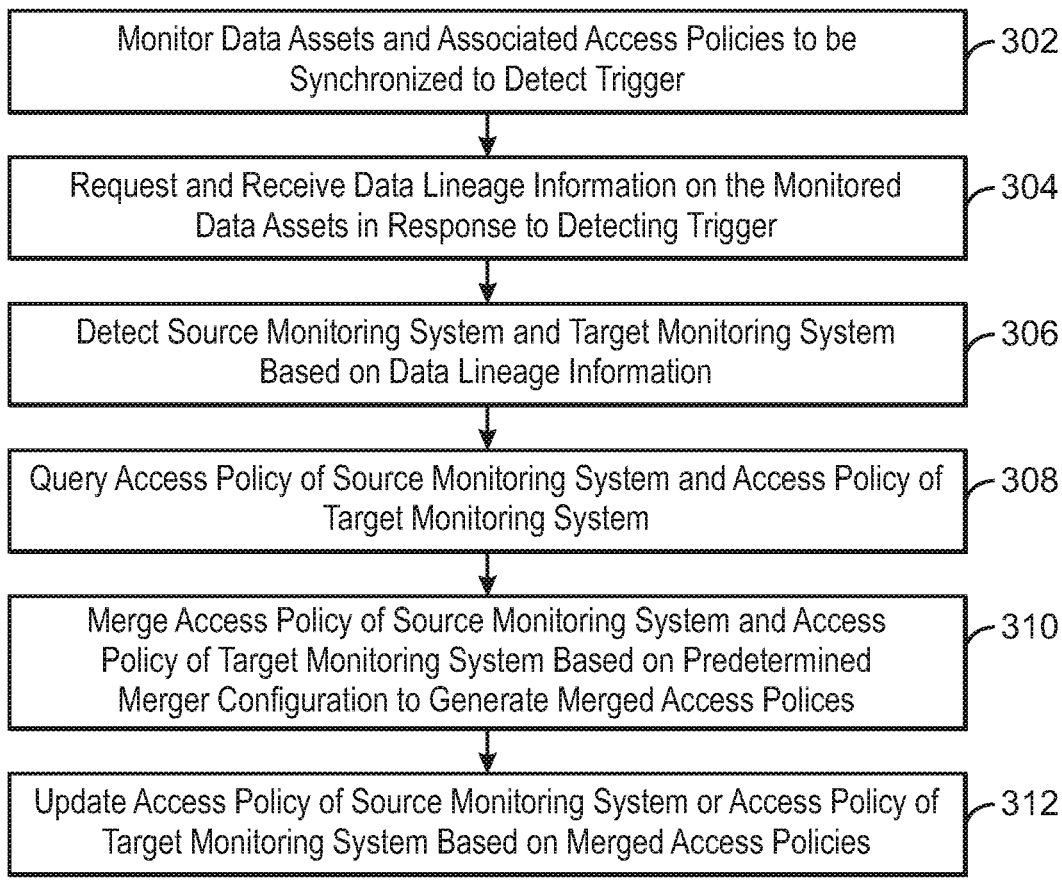
FIG. 3 is a process flow diagram of an example method that can update monitoring systems using merged data policies.

FIG. 3 is a process flow diagram of an example method that can update monitoring systems using merged data policies. The method 300 can be implemented with any suitable computing device, such as the computing device 400 of FIG. 4. For example, the method can be implemented via the processor 402 of computing device 400.

At block 302, the processor monitors a data asset and associated access policies to be synchronized to detect a trigger. For example, the processor may detect a write to the monitored data asset or a detected read of the monitored data asset, the data asset comprising sensitive content. In some examples, the processor may detect a change to the access policy of the source monitoring system or the access policy of the target monitoring system. In some examples, the processor may detect an execution of an extract, transform, load (ETL) job on the monitored data asset. In some examples, any of these event may server as triggers.

At block 304, the processor requests and receives data lineage information on the monitored data asset in response to detecting the trigger. In some examples, the processor may send a request for data lineage information from a data lineage system of a file system or a database. For example, the data lineage system may monitor the file system or database in response to receiving the request for data lineage information and provide the data lineage information to the processor.

At block 306, the processor detects a source monitoring system and a target monitoring system based on the data lineage information. For example, sensitive data may have been read from a data asset monitored by the source monitoring system, transformed, and written to a file system or database monitored by the target monitoring system.

At block 308, the processor queries an access policy of the source system and an access policy of the target system. For example, the access policy of the source system and the access policy of the target system may include rules that differ with respect to at least some sensitive data.

At block 310, the processor merges the access policy of the source monitoring system and the access policy of the target monitoring system based on a predetermined merger configuration to generate a merged access policy. In one example, if for asset A a user U can see sensitive information, and for Asset B with the same content the user U cannot see the sensitive information, then the access policy may be changed for one of the assets. For example, the user could either see sensitive information in both assets or not see the sensitive information in both of the assets. In some examples, the merger configuration may be a predetermined merger configuration. In some examples, the merger configuration may be preconfigured by an administrator. In some examples, the processor can apply a rule associated with a data asset of a higher rank in a hierarchy to a data asset of a lower rank in the hierarchy. For example, more restrictive rules of data assets with higher rank may be applied to data assets with lower rank. In some examples, less restrictive rules of data assets with higher rank may also be applied to data assets of lower rank.

At block 312, the processor updates the access policy of the source monitoring system or the access policy of the target monitoring system based on the merged access policy. For example, the processor can create new rules based on the merged access policy and replace existing rules at the monitoring system via an application programming interface. In some examples, the processor can update an access policy in response to detecting sensitive data in a data asset has not been masked or redacted.

The process flow diagram of FIG. 3 is not intended to indicate that the operations of the method 300 are to be executed in any particular order, or that all of the operations of the method 300 are to be included in every case. Additionally, the method 300 can include any suitable number of additional operations. For example, the processor may not update a second monitoring system in response to detecting sensitive data in a data asset being masked or redacted at the second monitoring system. The processor may thus operate more efficiently by not updating monitoring systems that may not need to be updated.

Figure 4:
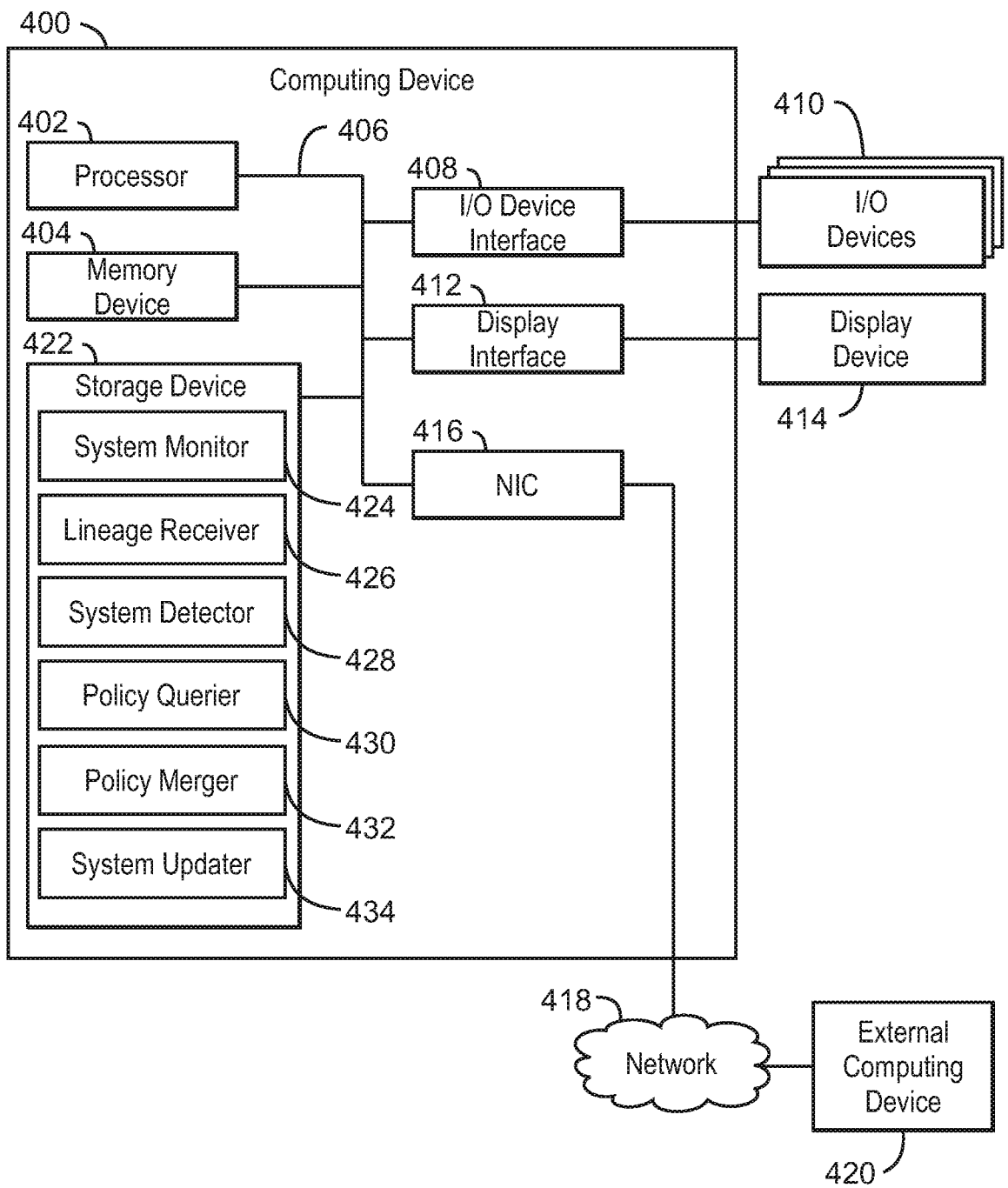
FIG. 4 is a block diagram of an example computing device that can update monitoring systems using merged data policies.

With reference now to FIG. 4, an example computing device can update monitoring systems using merged data policies. The computing device 400 may be for example, a server, a network device, desktop computer, laptop computer, tablet computer, or smartphone. In some examples, computing device 400 may be a cloud computing node. Computing device 400 may be described in the general context of computer system executable instructions, such as program modules, being executed by a computer system. Generally, program modules may include routines, programs, objects, components, logic, data structures, and so on that perform particular tasks or implement particular abstract data types. Computing device 400 may be practiced in distributed cloud computing environments where tasks are performed by remote processing devices that are linked through a communications network. In a distributed cloud computing environment, program modules may be located in both local and remote computer system storage media including memory storage devices.

The computing device 400 may include a processor 402 that is to execute stored instructions, a memory device 404 to provide temporary memory space for operations of said instructions during operation. The processor can be a single-core processor, multi-core processor, computing cluster, or any number of other configurations. The memory 404 can include random access memory (RAM), read only memory, flash memory, or any other suitable memory systems.

The processor 402 may be connected through a system interconnect 406 (e.g., PCI®, PCI-Express®, etc.) to an input/output (I/O) device interface 408 adapted to connect the computing device 400 to one or more I/O devices 410. The I/O devices 410 may include, for example, a keyboard and a pointing device, wherein the pointing device may include a touchpad or a touchscreen, among others. The I/O devices 410 may be built-in components of the computing device 400, or may be devices that are externally connected to the computing device 400.

The processor 402 may also be linked through the system interconnect 406 to a display interface 412 adapted to connect the computing device 400 to a display device 414. The display device 414 may include a display screen that is a built-in component of the computing device 400. The display device 414 may also include a computer monitor, television, or projector, among others, that is externally connected to the computing device 400. In addition, a network interface controller (NIC) 416 may be adapted to connect the computing device 400 through the system interconnect 406 to the network 418. In some embodiments, the NIC 416 can transmit data using any suitable interface or protocol, such as the internet small computer system interface, among others. The network 418 may be a cellular network, a radio network, a wide area network (WAN), a local area network (LAN), or the Internet, among others. An external computing device 420 may connect to the computing device 400 through the network 418. In some examples, external computing device 420 may be an external webserver 420. In some examples, external computing device 420 may be a cloud computing node.

The processor 402 may also be linked through the system interconnect 406 to a storage device 422 that can include a hard drive, an optical drive, a USB flash drive, an array of drives, or any combinations thereof. In some examples, the storage device may include a system monitor 424, a lineage receiver 426, a system detector 428, a policy querier 430, a policy merger module 432, and a system updater 434. The system monitor 424 can monitor a data asset and associated access policies to be synchronized to detect a trigger. For example, the trigger may be a detected write to the monitored data asset or a detected read of the monitored data asset, the data asset including sensitive content. In some examples, the trigger may be a detected change to the access policy of the source monitoring system or the access policy of the target monitoring system. In some examples, the trigger may be a detected execution of an extract, transform, load (ETL) job. In some examples, the trigger may be a scheduled periodic trigger. For example, the data lineage may be executed on a periodic schedule by a scheduler. The lineage receiver 426 can then request and receive data lineage information on the monitored data asset in response to detecting the trigger. For example, the lineage receiver 426 may request and receive data lineage information on the monitored data asset from a data lineage system of a file system or a database. The system detector 428 can detect a source monitoring system and a target monitoring system based on the data lineage information. For example, the source monitoring system and the target monitoring system comprise a file access monitoring system, or a database access monitoring system, or both. The querier 430 can query an access policy of the source monitoring system and an access policy of the target monitoring system. The policy merger 432 can merge the access policy of the source monitoring system and the access policy of the target monitoring system based on a predetermined merger configuration to generate a merged access policy. In some examples, the policy merger 432 can apply a rule associated with a data asset of a higher rank in a hierarchy to a data asset of a lower rank in the hierarchy. The system updater 434 can update the access policy of the source monitoring system, or the access policy of the target monitoring system, or both, based on the merged access policy. In some examples, system updater 434 can update the access policy of the source monitoring system, or the access policy of the target monitoring system, in response to detecting sensitive data in a data asset is not masked or redacted at the monitoring system to be updated.

It is to be understood that the block diagram of FIG. 4 is not intended to indicate that the computing device 400 is to include all of the components shown in FIG. 4. Rather, the computing device 400 can include fewer or additional components not illustrated in FIG. 4 (e.g., additional memory components, embedded controllers, modules, additional network interfaces, etc.). Furthermore, any of the functionalities of the system monitor 424, the lineage receiver 426, the system detector 428, the policy querier 430, the policy merger 432, and the system updater 434, may be partially, or entirely, implemented in hardware and/or in the processor 402. For example, the functionality may be implemented with an application specific integrated circuit, logic implemented in an embedded controller, or in logic implemented in the processor 402, among others. In some embodiments, the functionalities of the system monitor 424, the lineage receiver 426, the system detector 428, the policy querier 430, the policy merger 432, and the system updater 434, can be implemented with logic, wherein the logic, as referred to herein, can include any suitable hardware (e.g., a processor, among others), software (e.g., an application, among others), firmware, or any suitable combination of hardware, software, and firmware.

Figure 5:
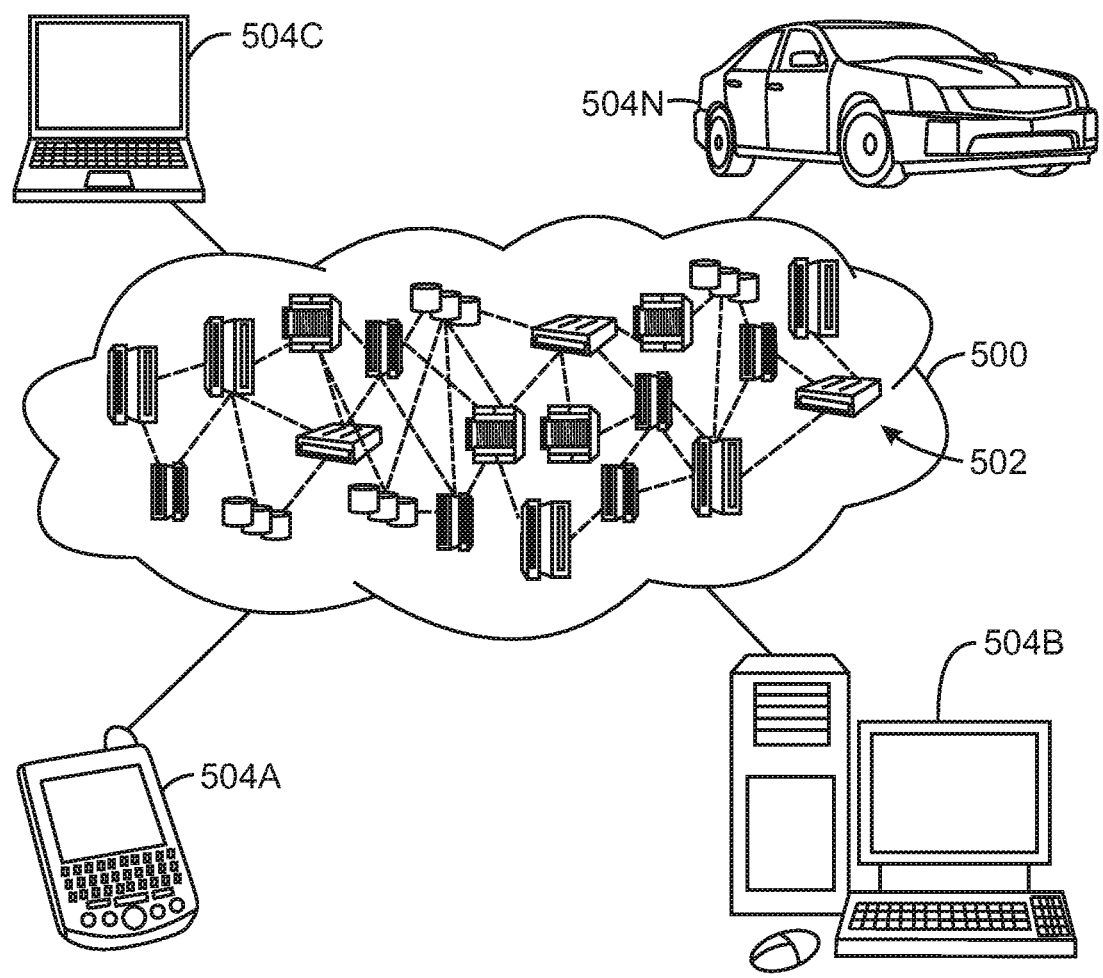
FIG. 5 is a block diagram of an example cloud computing environment according to embodiments described herein.

Referring now to FIG. 5, an illustrative cloud computing environment 500 is depicted. As shown, cloud computing environment 500 comprises one or more cloud computing nodes 502 with which local computing devices used by cloud consumers, such as, for example, personal digital assistant (PDA) or cellular telephone 504A, desktop computer 504B, laptop computer 504C, and/or automobile computer system 504N may communicate. Nodes 502 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 504A-N shown in FIG. 5 are intended to be illustrative only and that computing nodes 502 and cloud computing environment 500 can communicate with any type of computerized device over any type of network and/or network addressable connection (e.g., using a web browser).

Figure 6:
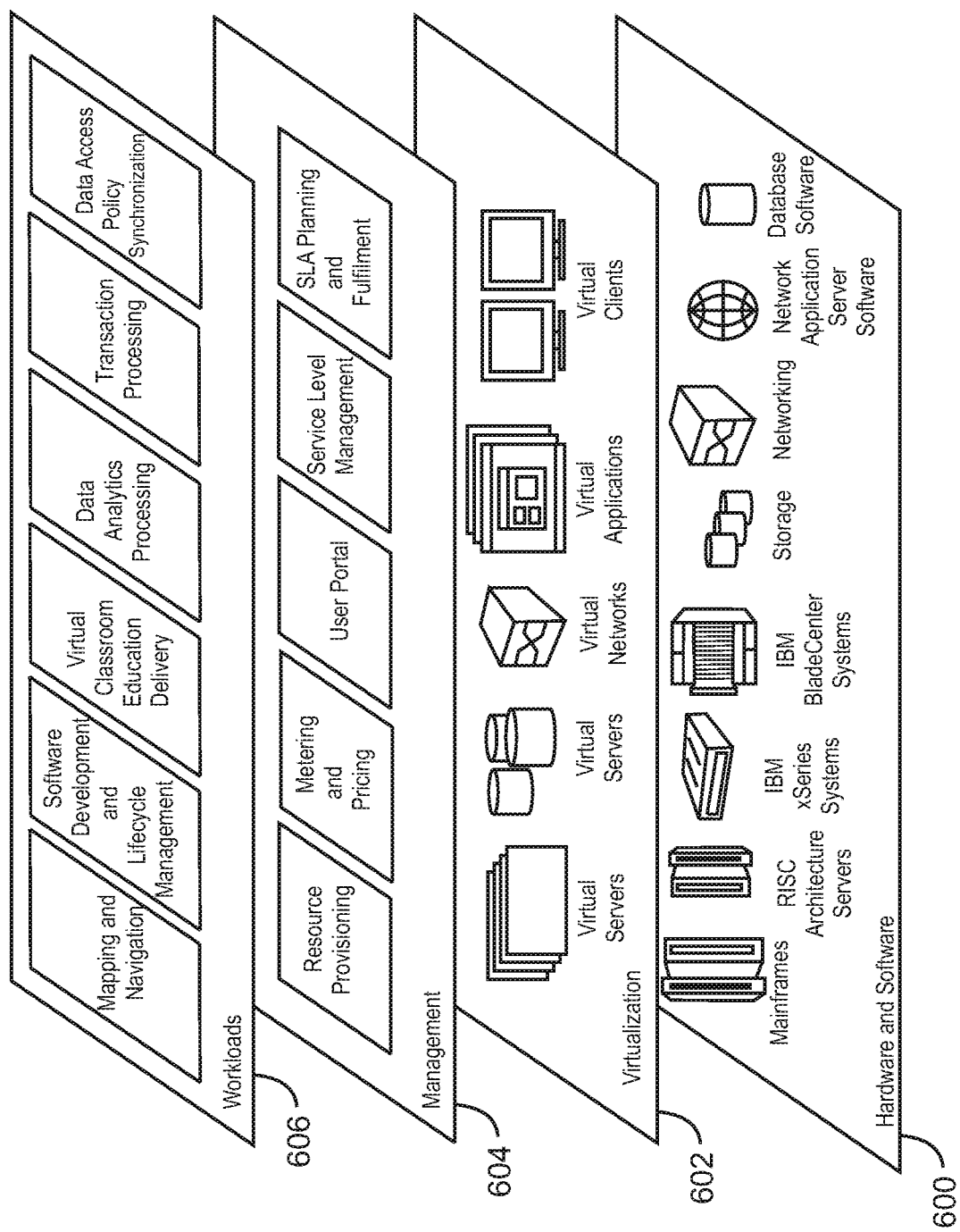
FIG. 6 is an example abstraction model layers according to embodiments described herein.

Referring now to FIG. 6, a set of functional abstraction layers provided by cloud computing environment 500 (FIG. 5) is shown. It should be understood in advance that the components, layers, and functions shown in FIG. 6 are intended to be illustrative only and embodiments of the invention are not limited thereto. As depicted, the following layers and corresponding functions are provided.

Hardware and software layer 600 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 602 provides an abstraction layer from which the following examples of virtual entities may be provided: virtual servers; virtual storage; virtual networks, including virtual private networks; virtual applications and operating systems; and virtual clients. In one example, management layer 604 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 606 provides examples of functionality for which the cloud computing environment may be utilized. Examples of workloads and functions which may be provided from this layer include: mapping and navigation; software development and lifecycle management; virtual classroom education delivery; data analytics processing; transaction processing; and data access policy synchronization.

The present techniques may be a system, a method or computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present techniques may be assembler instructions, instruction-set-architecture (ISA) instructions, machine instructions, machine dependent instructions, microcode, firmware instructions, state-setting data, or either code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present techniques.

Aspects of the present techniques are described herein with reference to flowchart illustrations and/or block diagrams of methods, apparatus (systems), and computer program products according to embodiments of the techniques. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 7:
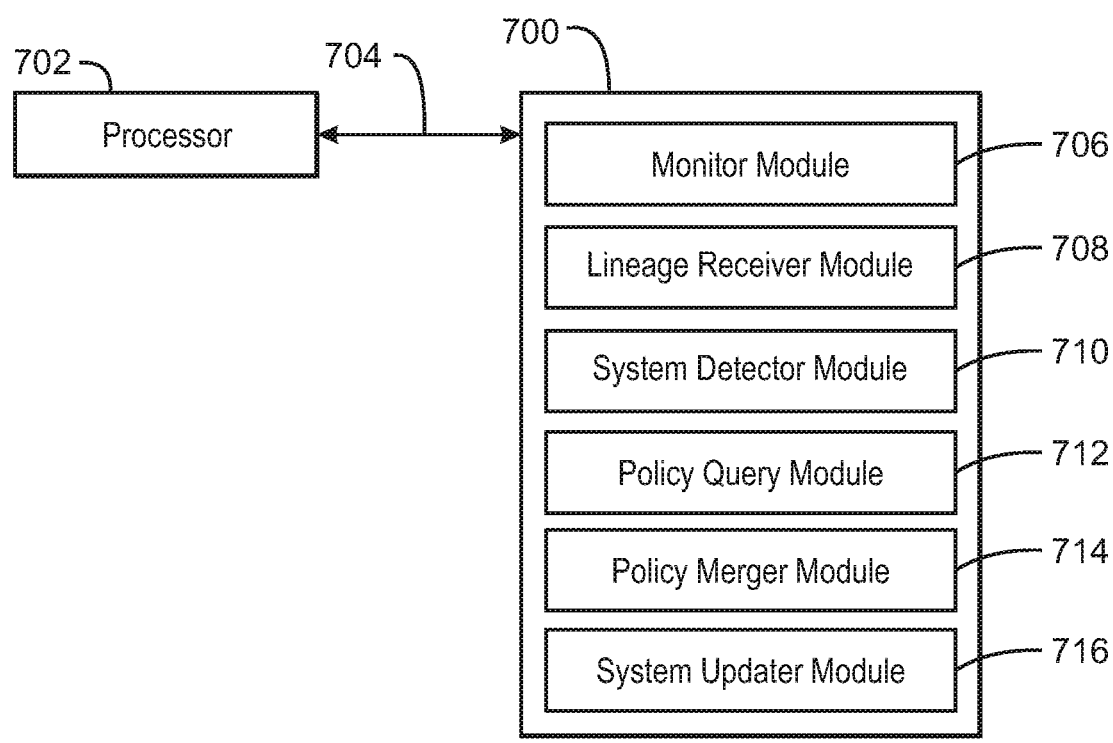
FIG. 7 is an example tangible, non-transitory computer-readable medium that can update monitoring systems using merged data policies.

Referring now to FIG. 7, a block diagram is depicted of an example tangible, non-transitory computer-readable medium 700 that can update monitoring systems using merged data policies. The tangible, non-transitory, computer-readable medium 700 may be accessed by a processor 702 over a computer interconnect 704. Furthermore, the tangible, non-transitory, computer-readable medium 700 may include code to direct the processor 702 to perform the operations of the method 300 of FIG. 3 above.

The various software components discussed herein may be stored on the tangible, non-transitory, computer-readable medium 700, as indicated in FIG. 7. For example, a monitor module 706 includes code to monitor a data asset and associated access policies to be synchronized to detect a trigger. In some examples, the monitor module 706 may also include code to detect the trigger based on a detected change to the access policy of the source monitoring system or the access policy of the target monitoring system. The monitor module 706 may also include code to detect the trigger based on a detected execution of an extract, transform, load (ETL) job. A lineage receiver module 708 includes code to execute a data lineage on the monitored data asset in response to detecting the trigger. A system detector module 710 includes code to detect a source system and a target system based on the data lineage. A policy query module 712 includes code to query an access policy of the source system and an access policy of the target system. A policy merger module 714 includes code to merge the access policy of the source system and the access policy of the target system based on a predetermined merger configuration to generate a merged access policy. A system updater module 716 includes code to update a monitoring system based on the merged access policy. In some examples, the system updater module 716 can include code to schedule a periodic trigger to be detected as the trigger. It is to be understood that any number of additional software components not shown in FIG. 7 may be included within the tangible, non-transitory, computer-readable medium 700, depending on the particular application.

The flowchart and block diagrams in the Figures illustrate the architecture, functionality, and operation of possible implementations of systems, methods, and computer program products according to various embodiments of the present techniques. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising a processor and a memory device, the processor configured to:
   detect a trigger of a plurality of triggers relating to one or more systems accessing a centrally-stored data asset according to associated access policies, wherein the plurality of triggers includes an extract transform load (ETL) job of the centrally stored data asset that writes some of the centrally stored data asset to a remote location;
   request and receive data lineage information on the centrally-stored data asset in response to detecting the trigger, the data lineage information including transfer data of the centrally-stored data asset between systems;
   detect a source monitoring system and a target monitoring system of the data lineage information;
   detect that an access policy of the source monitoring system is different than an access policy of the target monitoring system;
   merge, in response to detecting the difference, the access policy of the source monitoring system and the access policy of the target monitoring system based on a predetermined merger configuration to generate a merged access policy; and
   update at least one of the access policy of the source monitoring system or the access policy of the target monitoring system based on the merged access policy.

2. The system of claim 1, wherein the source monitoring system and the target monitoring system includes a file access monitoring system, or a database access monitoring system.

3. The system of claim 1, wherein the processor updates the access policy of the source monitoring system, or the access policy of the target monitoring system, in response to detecting sensitive data in the centrally-stored data asset is not masked or redacted at the monitoring system to be updated.

4. The system of claim 1, wherein the plurality of triggers includes a detected write to the centrally-stored data asset or a detected read of the centrally-stored data asset, the centrally-stored data asset comprising sensitive content.

5. The system of claim 1, wherein the plurality of triggers includes a detected change to the access policy of the source monitoring system or the access policy of the target monitoring system.

6. The system of claim 1, wherein the plurality of triggers includes a scheduled periodic trigger.

7. A computer-implemented method, comprising:
   detecting, via a processor, a trigger of a plurality of triggers relating to one or more systems accessing a centrally-stored data asset according to associated access policies, wherein the plurality of triggers includes an extract transform load (ETL) job of the centrally stored data asset that writes some of the centrally stored data asset to a remote location;
   requesting and receiving, via the processor, data lineage information on the centrally-stored data asset in response to detecting the trigger, the data lineage information including transfer data of the centrally-stored data asset between systems;
   detecting, via the processor, a source monitoring system and a target monitoring system of the data lineage information;
   detecting that, via the processor, an access policy of the source monitoring system is different than an access policy of the target monitoring system;
   merging, via the processor and in response to detecting the difference, the access policy of the source monitoring system and the access policy of the target monitoring system based on a predetermined merger configuration to generate a merged access policy; and
   updating, via the processor, the access policy of the source monitoring system and the access policy of the target monitoring system based on the merged access policy.

8. The computer-implemented method of claim 7, wherein the plurality of triggers includes a write to the centrally-stored data asset or a detected read of the centrally-stored data asset, the centrally-stored data asset comprising sensitive content.

9. The computer-implemented method of claim 7, wherein the plurality of triggers includes a change to the access policy of the source monitoring system or the access policy of the target monitoring system.

10. The computer-implemented method of claim 7, wherein the merging the access policy of the source monitoring system and the access policy of the target monitoring system includes applying a rule associated with a centrally-stored data asset of a higher rank in a hierarchy to a centrally-stored data asset of a lower rank in the hierarchy.

11. The computer-implemented method of claim 7, wherein the updating the access policy of the source monitoring system or the access policy of the target monitoring system is performed in response to detecting sensitive data in centrally-stored data asset not being masked or redacted at the monitoring system to be updated.

12. The computer-implemented method of claim 7, wherein the updating the access policy of the monitoring system includes creating new rules based on the merged access policy and replacing existing rules at the monitoring system via an application programming interface.

13. A computer program product for updating monitoring systems, the computer program product comprising a computer-readable storage medium having program code embodied therewith, wherein the computer readable storage medium is not a transitory signal per se, the program code executable by a processor to cause the processor to:
- detect a trigger of a plurality of triggers relating to one or more systems accessing a centrally-stored data asset according to associated access policies, wherein the plurality of triggers includes an extract transform load (ETL) job of the centrally stored data asset that writes some of the centrally stored data asset to a remote location;
- request and receive data lineage information on the centrally-stored data asset in response to detecting the trigger, the data lineage information including transfer data of the centrally-stored data asset between systems;
- detect a source system and a target system of the data lineage information;
- detect that an access policy of the source system is different than an access policy of the target system;
- merge, in response to detecting the difference, the access policy of the source system and the access policy of the target system based on a predetermined merger configuration to generate a merged access policy; and
- update the access policy of the source system or the access policy of the target system based on the merged access policy.

14. The computer program product of claim 13, wherein the program code is further executable by the processor such that the plurality of triggers includes a detected change to the access policy of the source system or the access policy of the target system.

15. The computer program product of claim 13, wherein the program code is further executable by the processor such that the plurality of triggers includes a scheduled periodic trigger.

16. The computer program product of claim 13, wherein the program code is further executable by the processor to apply a rule associated with a centrally-stored data asset of a higher rank in a hierarchy to a centrally-stored data asset of a lower rank in the hierarchy.

17. The computer program product of claim 13, wherein the program code is executable by the processor to update the target system in response to detecting sensitive data in the centrally-stored data asset not being masked or redacted at the target system.

* * * * *